(12) United States Patent
Wilson et al.

(10) Patent No.: US 9,080,768 B2
(45) Date of Patent: Jul. 14, 2015

(54) GASIFIER PREHEATER FUEL SYSTEM AND METHODS OF ASSEMBLING SAME

(71) Applicant: General Electric Company, Schenectady, NY (US)

(72) Inventors: John Caleb Wilson, Houston, TX (US); Jennifer Lucia Ramirez, Houston, TX (US); James Scott Kain, Houston, TX (US); Shaoping Shi, Bellaire, TX (US); Dinh-Cuong Vuong, Sugar Land, TX (US); Edward Pan, Houston, TX (US)

(73) Assignee: General Electric Company, Schenectady, NY (US)

( * ) Notice: Subject to any disclaimer, the term of this patent is extended or adjusted under 35 U.S.C. 154(b) by 506 days.

(21) Appl. No.: 13/671,597

(22) Filed: Nov. 8, 2012

(65) Prior Publication Data

US 2014/0127089 A1    May 8, 2014

(51) Int. Cl.
| | | |
|---|---|---|
| C10J 3/00 | (2006.01) | |
| F23M 5/06 | (2006.01) | |
| F23C 5/08 | (2006.01) | |
| C10J 3/48 | (2006.01) | |
| C10J 3/72 | (2006.01) | |

(52) U.S. Cl.
CPC . *F23M 5/06* (2013.01); *C10J 3/485* (2013.01); *C10J 3/726* (2013.01); *F23C 5/08* (2013.01); *C10J 2200/152* (2013.01); *C10J 2300/1653* (2013.01); *Y02E 20/18* (2013.01); *Y10T 29/49348* (2015.01)

(58) Field of Classification Search
CPC .............. C10J 3/726; C10J 3/485; F23C 5/08
See application file for complete search history.

(56) References Cited

U.S. PATENT DOCUMENTS

| | | | |
|---|---|---|---|
| 3,920,417 A | | 11/1975 | Fernandes |
| 4,113,445 A | | 9/1978 | Gettert et al. |
| 4,238,923 A | | 12/1980 | Waryasz |
| 4,275,044 A | | 6/1981 | Kamody |
| 4,345,173 A | | 8/1982 | Marchant et al. |
| 4,430,095 A | * | 2/1984 | Gilbert .................. 48/189.5 |
| 4,455,949 A | * | 6/1984 | Kretschmer et al. ......... 110/263 |
| 5,785,721 A | | 7/1998 | Brooker |
| 6,033,447 A | | 3/2000 | Moock et al. |
| 6,053,961 A | | 4/2000 | Satchell, Jr. |
| 6,200,522 B1 | | 3/2001 | Satchell, Jr. |
| 7,575,612 B2 | | 8/2009 | Wallace |
| 7,621,973 B2 | | 11/2009 | Wallace |
| 7,670,574 B2 | | 3/2010 | Goller et al. |
| 7,744,663 B2 | | 6/2010 | Wallace |
| 7,749,290 B2 | | 7/2010 | Wallace |

(Continued)

FOREIGN PATENT DOCUMENTS

WO    2011071339 A2    6/2011

OTHER PUBLICATIONS

Eastman Chemical Company, Sulfur-free emission start-up process for gasification reactors, 2011, (2 pages).

*Primary Examiner* — Matthew Merkling
(74) *Attorney, Agent, or Firm* — Armstrong Teasdale LLP

(57) ABSTRACT

Gasifier preheater fuel and moderator injection apparatus, systems and methods are provided. A preheater distributor ring is securely mounted within the shell dome of a gasification vessel, for the selective discharge of preheat fuel and oxidizer into the vessel during preheating operations, or for the selective discharge of moderating agents into the vessel during normal gasification operations.

14 Claims, 8 Drawing Sheets

(56) References Cited

U.S. PATENT DOCUMENTS

| | | |
|---|---|---|
| 7,833,315 B2 | 11/2010 | Lissianski et al. |
| 8,038,747 B2 | 10/2011 | Wallace |
| 8,151,716 B2 | 4/2012 | Harned et al. |
| 8,163,047 B2 | 4/2012 | Goller et al. |
| 2010/0180965 A1* | 7/2010 | Guo et al. ............... 137/590 |
| 2012/0085028 A1 | 4/2012 | Leininger |
| 2012/0210645 A1* | 8/2012 | Rutberg et al. ............ 48/87 |
| 2015/0090938 A1* | 4/2015 | Meyer et al. ............ 252/373 |

\* cited by examiner

GASIFIER PREHEATER FUEL SYSTEM AND METHODS OF ASSEMBLING SAME

BACKGROUND OF THE INVENTION

The present disclosure relates generally to gasification systems, and more specifically, to a gasifier that includes an integral preheater fuel and moderator injection system. Such a gasifier can be integrated in an integrated gasification combined cycle (IGCC) power generation system or any other chemical processing system.

At least some known combined cycle power systems used for power generation include a gasification system that is integrated with at least one power-producing turbine system. For example, known gasifiers convert a mixture of fuel, air or oxygen, steam, and/or limestone into an output of partially combusted gas, sometimes referred to as "syngas." Hot combustion gases produced are supplied to the combustor of a gas turbine engine, which powers a generator that supplies electrical power to a power grid. Exhaust from at least some known gas turbine engines is routed to a heat recovery steam generator that generates steam for driving a steam turbine. Power generated by the steam turbine also provides additional electrical power to the power grid.

Gasifiers tend to be physically large devices that typically must be preheated prior to the initiation of the actual gasification process. Preheating a gasifier may take several hours, due to the size and bulk of a typical gasifier. In at least some known gasifiers, the preheater structures, including injectors or nozzles for fuel and oxidizer, are removable components that must be inserted into the gasifier shell prior to preheating, and then removed following preheating. After removing the components, the gasification feedstock feed structures used during the actual gasification process must be installed, aligned, secured and checked for leaks, amongst other procedures, before the actual gasification process can begin. Preheater structures operate using gaseous fuels, such as natural gas or propane. However, the gasifier feedstock feed structures that deliver fuels such as pulverized coal, are ill-suited to deliver natural gas, propane, or other gaseous or atomizable liquid agents.

The removal of the preheater structures, and subsequent installation of the gasification feed structures can take several hours. During this time, the interior of the gasifier can begin to cool down. Accordingly, because the refractory materials lining the interior of the gasifier must be at a minimum "light-off" temperature before the gasification process can begin, it may be necessary to preheat the interior of the gasifier to a higher temperature and/or for a longer period of time, in order to accommodate the loss of heat and temperature that occurs during the changeover of preheater and gasification feed equipment. Furthermore, plant workers may be compelled to hurry their work in order to complete the installation of the gasification feedstock injection equipment before the gasifier has cooled too much. The equipment used in both the preheater and gasification feedstock feed structures tend to be large, heavy, and cumbersome and awkward to handle. Accordingly, each switchover between preheater and gasification structures involves safety issues resulting from the nature of the equipment being moved, and the perceived sense of urgency of the crews performing the equipment switchover.

In at least some other known gasification systems, preheater structures are provided in gasifiers that are permanently installed. However, such preheater structures are operated continuously, including during actual gasification. Continued operation of such equipment can result in premature degradation of the preheater structures due to thermal cycling. Accordingly, it would be desirable to provide a system and method for preheating a gasifier in a plant that addresses the foregoing efficiency, safety and equipment degradation concerns.

BRIEF DESCRIPTION OF THE INVENTION

In an aspect, a gasifier is provided. The gasifier includes a vessel comprising a dome having a longitudinal axis extending therethrough. The gasifier further includes a primary nozzle assembly coupled to the dome for injecting gasifier feedstock and oxidizer into said vessel during normal gasification operations. The gasifier further includes a preheater assembly securely coupled to said vessel, said preheater assembly configured to selectively discharge at least one of fuel and oxidizer, and at least one of cooling agent and moderating agent into said vessel to facilitate preheating said gasifier prior to normal gasification operations.

In another aspect, a method for assembling a gasifier is provided. The method includes providing a vessel comprising a dome having a longitudinal axis extending therethrough. The method further includes coupling a primary nozzle assembly to said dome for injecting gasifier feedstock and oxidizer into said vessel during normal gasification operations. The method further includes coupling a preheater assembly securely to said vessel, said preheater assembly configured to selectively discharge at least one of fuel and oxidizer, and at least one of cooling agent and moderating agent into said vessel to facilitate preheating said gasifier prior to normal gasification operations.

In still another aspect, a gasifier preheater system for use with a gasifier is provided, wherein said gasifier includes a vessel including a dome having a longitudinal axis extending therethrough. The gasifier preheater system includes a primary nozzle assembly coupled to said dome for injecting gasifier feedstock and oxidizer into said vessel during normal gasification operations. The gasifier preheater system further includes a preheater assembly securely coupled to said vessel, said preheater assembly configured to selectively discharge at least one of fuel and oxidizer, and at least one of cooling agent and moderating agent into said vessel to facilitate preheating said gasifier prior to normal gasification operations.

DETAILED DESCRIPTION OF THE INVENTION

Figure 1:
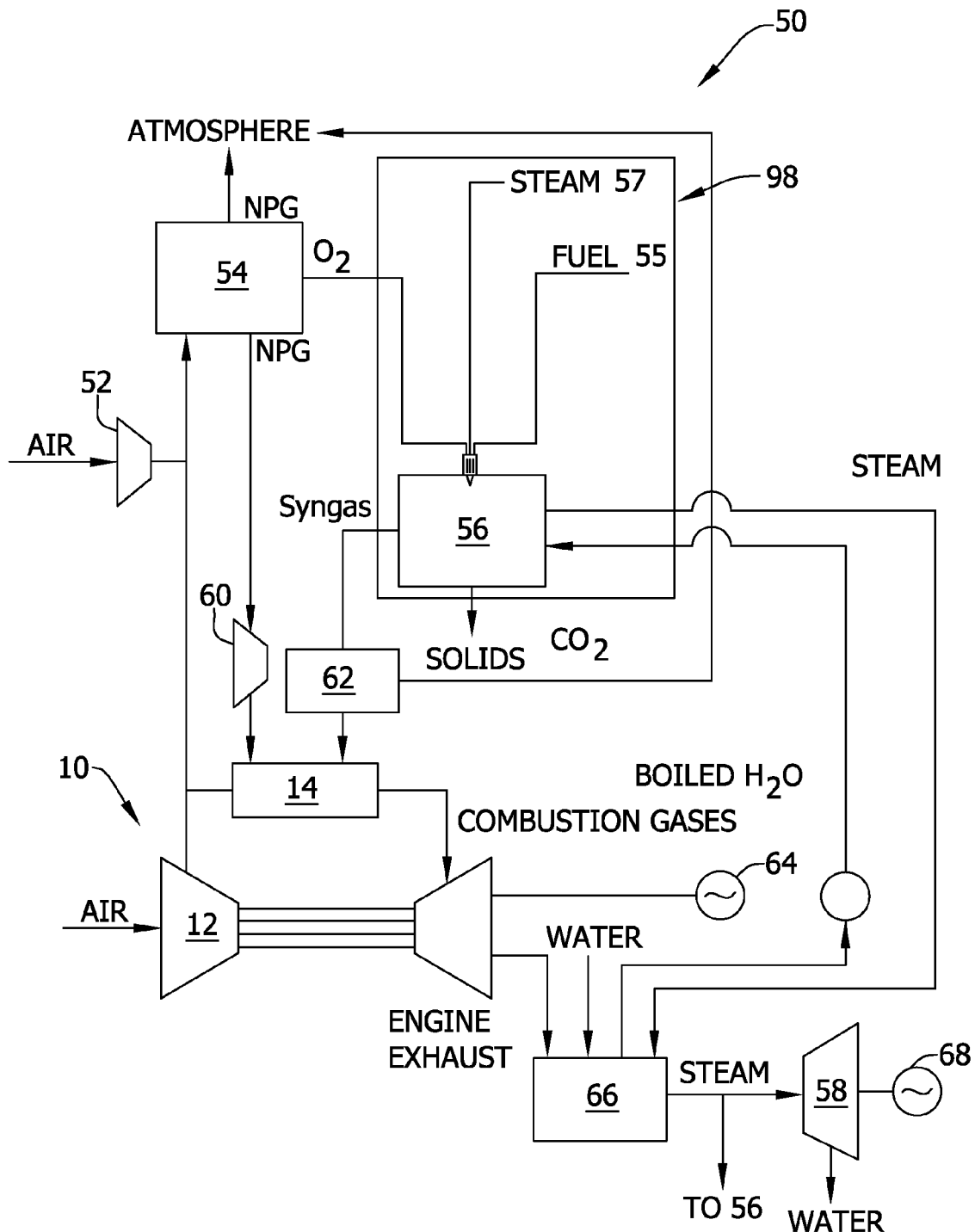
FIG. 1 is a schematic diagram of an exemplary known combined cycle power system.

FIG. 1 is a schematic diagram of an exemplary known combined-cycle power system 50. System 50 generally includes a main air compressor 52, an air separation unit 54 coupled in flow communication to compressor 52, a gasifier 56 coupled in flow communication to air separation unit 54, and a gas turbine engine 10 coupled in flow communication to gasifier 56.

In operation, compressor 52 compresses ambient air that is channeled to air separation unit 54. In some embodiments, in addition to compressor 52 or alternatively, compressed air from a gas turbine engine compressor 12 is supplied to air separation unit 54. Air separation unit 54 uses the compressed air to generate oxygen for use by gasifier 56. More specifically, air separation unit 54 separates the compressed air into separate flows of oxygen ($O_2$) and a gas by-product, sometimes referred to as "process gas" or "NPG." The $O_2$ flow is channeled to gasifier 56 for use in generating partially combusted gases, referred to herein as "syngas" for use by a gas turbine engine 10 as fuel, as described below in more detail. Gas turbine engine 10 is used to drive a generator 64. Moreover, in some known systems 50, some of the NPG flow is injected into a combustion zone (not shown) within a gas turbine engine combustor 14 to facilitate controlling emissions of engine 10, and more specifically to facilitate reducing the combustion temperature and reducing nitrous oxide emissions from engine 10. In the exemplary embodiment, system 50 includes a compressor 60 for compressing the nitrogen process gas flow before being injected into the combustion zone.

A gasification system 98 includes gasifier 56, as well as a fuel source 55, an oxygen ($O_2$) source (from air separation unit 54), a steam source 57, and a carbon dioxide ($CO_2$) source (not shown). Gasifier 56 converts a mixture of fuel, $O_2$ supplied by air separation unit 54, steam, and/or limestone into an output of syngas for use by gas turbine engine 10 as fuel. Although gasifier 56 may use any fuel, in some known systems 50, gasifier 56 uses coal (particularly pulverized coal), petroleum coke, residual oil, oil emulsions, tar sands, and/or other similar fuels. In some known systems 50, the syngas generated by gasifier 56 includes carbon dioxide ($CO_2$). In the exemplary embodiment, syngas generated by gasifier 56 is cleaned in a clean-up device 62 before being channeled to gas turbine engine combustor 14 for combustion thereof. Carbon dioxide ($CO_2$) may be separated from the syngas during clean-up and, in some known systems 50, may be vented to the atmosphere. Gas turbine engine 10 drives a generator 64 that supplies electrical power to a power grid (not shown). Exhaust gases from gas turbine engine 10 are channeled to a heat recovery steam generator 66 that generates steam for driving a steam turbine 58. Power generated by steam turbine 58 drives an electrical generator 68 that provides electrical power to the power grid. In some known systems 50, steam from a heat recovery steam generator 66 is supplied to gasifier 56 for generating syngas.

Figure 2:
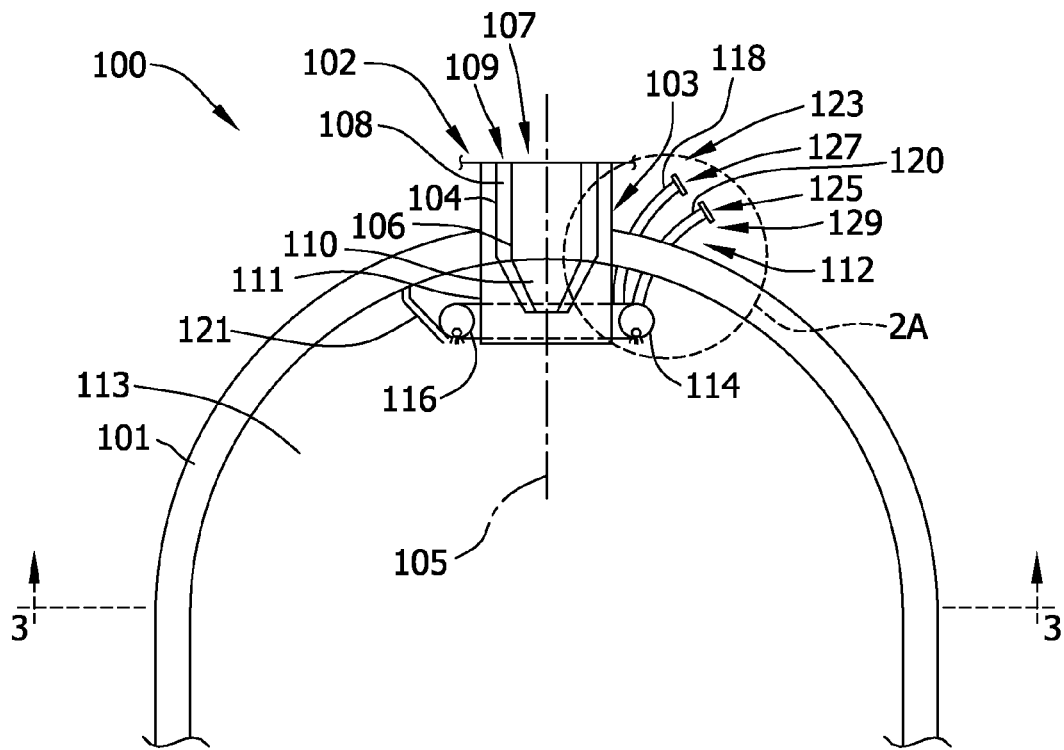
FIG. 2 is a sectional side elevation of an exemplary gasifier including a preheater fuel and moderator injector system that may be used in the system shown in FIG. 1.
Figure 3:
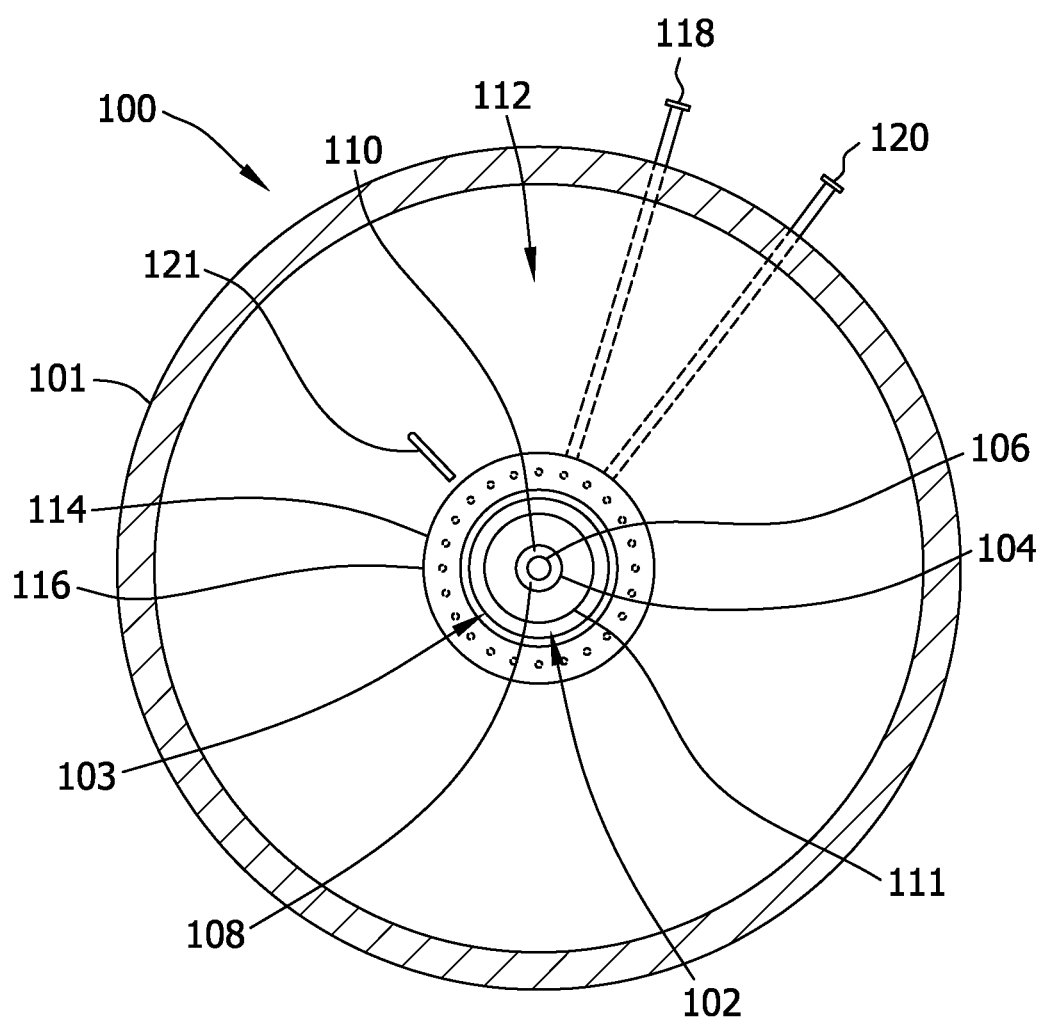
FIG. 3 is a sectional top view of the gasifier shown in FIG. 2.

FIGS. 2 and 3 illustrate an exemplary gasification vessel 100 which may be used in a gasification system. Specifically, FIG. 2 is a side elevation sectional view of a gasification vessel 100, and FIG. 3 is a sectional top view of the gasification vessel 100 shown in FIG. 2. In the exemplary embodiment, gasification vessel 100 includes a shell dome 101 having a primary feed injector nozzle assembly 102 projecting through an aperture 103 in shell dome 101. Primary feed injector nozzle assembly 102 is substantially concentrically oriented with respect to a longitudinal axis 105. Primary feed injector nozzle assembly 102 includes an outer tube 111 that circumscribes a nozzle 104. Nozzle 104 is radially outward from a nozzle 106. An annular passage 108 is defined between coaxially arranged nozzles 104 and 106. An oxidizer (air, $O_2$, etc.) is supplied from a source 109 through a passage 108. Nozzle 106 includes a central passage 110 defined therein through which gasification feedstock, as described herein, is supplied from a source 107 of gasification feedstock to be reacted with the oxidizer to produce synthetic gas (or syngas) in accordance with methods for producing syngas as are known by those of ordinary skill in the art. More passages can be used by adding more tubes in nozzle 104 to bring in extra oxidizer, moderator, or fuel.

A preheater assembly 112 is securely coupled within shell dome 101, using any suitable support structures (not shown). Preheater assembly 112 remains in gasification vessel 100, after preheater operations have ended, and during normal gasification operations. In the exemplary embodiment, preheater assembly 112 includes a distributor ring 114 that circumferentially extends about outer tube 111 and is substantially concentrically oriented about longitudinal axis 105. Distributor ring 114 includes a plurality of circumferentially-spaced apertures 116 that are spaced substantially uniformly. Preheater assembly 112 also includes one or more supply lines, e.g., supply lines 118 and 120 that are coupled either to a source 123 of fuel (e.g., natural gas, propane, etc.) and a source 125 of oxidizer, or are coupled to sources 127 and 129, respectively, of $CO_2$, steam, and/or other moderating or cooling agents. One or more igniters 121 are coupled adjacent to apertures 116 to ignite the fuel/air mixture discharged from apertures 116.

During a preheat operation, fuel is channeled through supply line 118 from source 123 to distributor ring 114, and an oxidizer (air, $O_2$, etc.) is routed through supply line 120 from source 125 to distributor ring 114. The air or oxidizer may be supplied at a slight pressure above ambient, such as through the use of a blower (not shown). If $O_2$, is supplied, nitrogen ($N_2$) may also be channeled to facilitate controlling flame and operating temperatures. The mixture of fuel and oxidizer is ignited via igniter 121 to initiate combustion of the fuel and oxidizer and to generate heat within the interior of gasification vessel 100. Combustion will continue until the refractory agents (not shown) lining gasification vessel 100 have been heated sufficiently to provide light-off for the gasification feedstock and oxidizer agents supplied by primary feed injector nozzle assembly 102 during the subsequent gasification procedure.

After completing the preheat operation, the supply of fuel and oxidizer through supply lines 118 and 120 is stopped. The gasification process may be initiated with a supply of feedstock and oxidizer to primary feed injector nozzle assembly 102, and into an interior 113 of gasification vessel 100. The feedstock, oxidizer, and heat within gasification vessel 100 combine to initiate the gasification reaction to generate syngas. During gasification, one or more supply lines 118 and/or 120 are coupled to $CO_2$ source 127 and/or to steam source 129, or to other sources of cooling and/or moderating agents, as desired and/or as required by the particular gasification process being utilized. The provision of $CO_2$ and/or steam delivery structures enables moderation of the gasification process both in terms of cooling of distributor ring 114, and in terms of controlling the operating conditions within gasification vessel 100, by enabling further control of temperature and oxygen/carbon (O/C) ratios in gasification vessel 100.

In alternative embodiments (not shown), mechanisms may be provided for cooling preheater assembly 112 during preheat operation. Cooling preheater assembly 112 can help preheater assembly 112 to resist structural deterioration resulting from thermal cycling occurring during preheating and gasification operations. In one alternative embodiment, cooling may be achieved through the addition of cooling agents, such as $CO_2$ or $N_2$, or $H_2O$ (in the form of steam, utility water, boiler feed water, recycled grey water, etc.), to the flow of air supplied to preheater assembly 112. In another alternative embodiment, a water jacket may be provided to encircle distributor ring 114. In another alternative embodiment, the outer surfaces of distributor rings 114 may be covered with refractory tile wrapping, or a similar insulating or ablative material. In still another alternative embodiment, a HVOF (high velocity oxy fuel) coating, fabricated from zirconia-ceramic or hard carbide materials (both having thermal barrier properties), may be used to coat preheater assembly 112.

Figure 4:
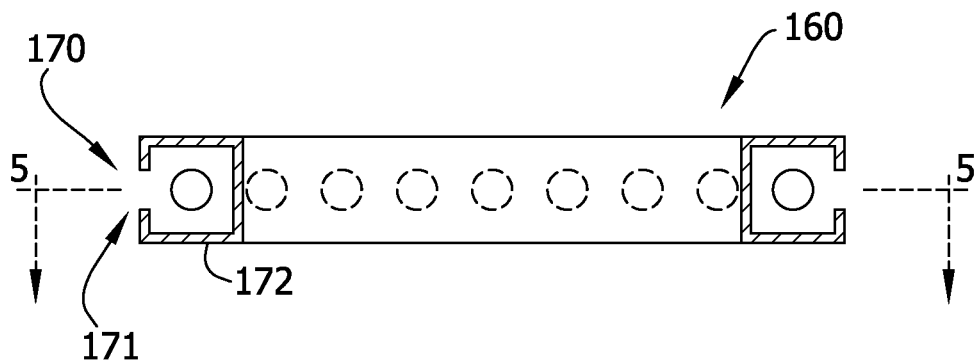
FIG. 4 is a sectional side elevation of an exemplary alternative distributor ring that may be used in the system shown in FIG. 1.
Figure 5:
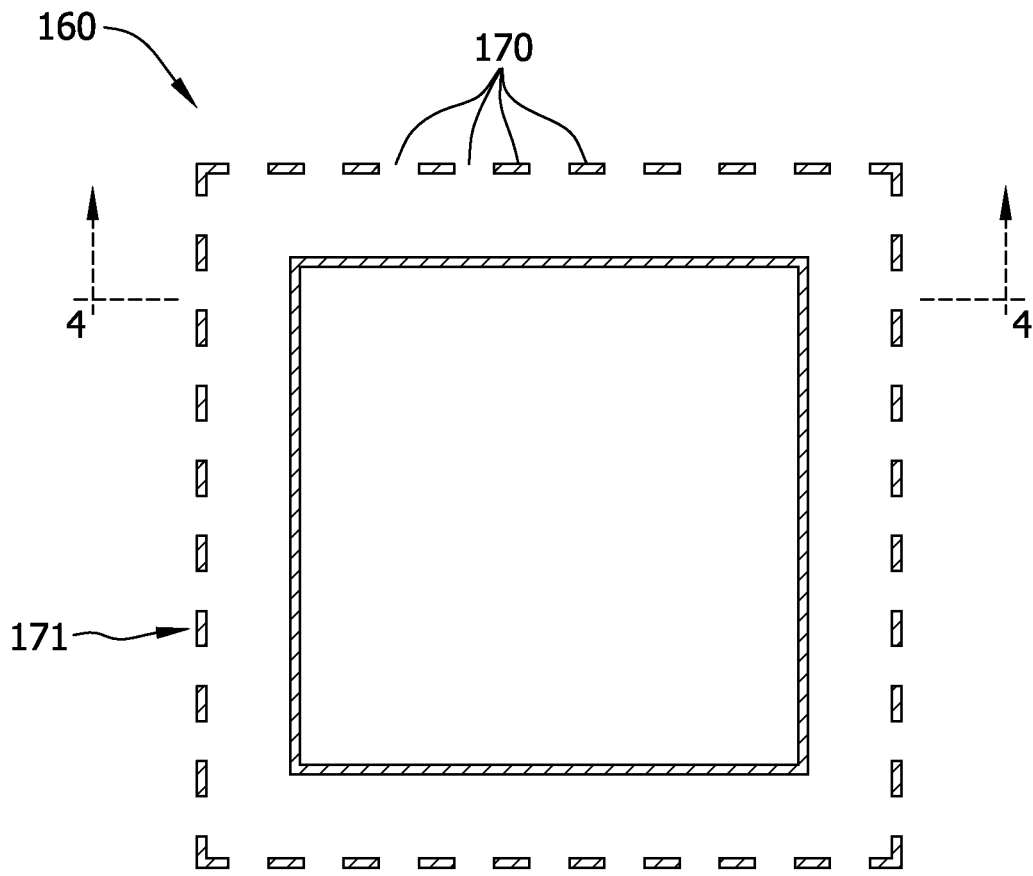
FIG. 5 is a sectional top view of the alternative distributor ring shown in FIG. 4.

Distributor ring 114 may have any suitable plan configuration, such as circular (as shown in FIG. 3), rectangular (as shown in FIGS. 4 and 5 and described hereinafter), or segmented (as shown in FIGS. 6-10 and described hereinafter). In addition, distributor ring 114 may have any suitable cross-sectional shape, such as circular (as shown in FIG. 2), elliptical, rectangular (shown in FIGS. 4 and 5), etc. Generally, distributor ring 114 has a configuration that substantially matches the contours of shell dome 101. In addition, distributor ring 114 is configured so as to radiate heat into the refractory agent lining (not shown) of gasification vessel 100, but preferably without exposing the interior surfaces of gasification vessel 100 to direct flames. In one embodiment, distributor ring 114 is positioned in close proximity to the ends of nozzles 104 and 106, and outer tube 111, such that distributor ring 114, nozzles 104 and 106, and outer tube 111 are all at approximately the same position, relative to longitudinal axis 105, and such that distributor ring apertures 116 are oriented to direct flow downwardly and away from nozzles 104 and 106, and outer tube 111. Nozzles 104 and 106, and outer tube 111 are further oriented to direct flow along longitudinal axis 105. In such an orientation, the discharges from distributor ring 114, nozzles 104 and 106, and outer tube 111 are each directed approximately along the same general direction toward the interior of gasification vessel 100. In alternative embodiments, distributor ring apertures 116 are directed radially away from longitudinal axis 105. Furthermore, distributor ring 114 may be positioned near shell dome 101 of gasification vessel 100, closer to the bottom (not shown) of gasification vessel 100, or at any desired position along the height of gasification vessel 100 that enables preheater assembly 112 to function as described herein. In alternative embodiments (not shown), in which distributor ring is positioned away from shell dome 101, distributor ring apertures 116 are positioned at any suitable location around distributor ring 114, including but not limited to, radially outwardly, downwardly, or even upwardly.

Figure 2A:
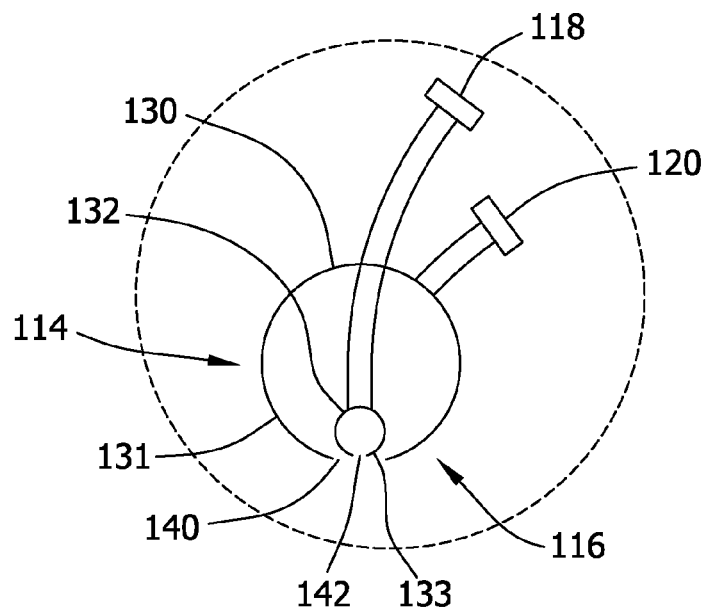
FIG. 2A is an enlarged view of a portion of a distributor ring shown in FIG. 2.

FIG. 2A is an enlarged view of a portion of distributor ring 114. In the exemplary embodiment, distributor ring 114 includes an outer tube 130 and an inner tube 132 that is radially inward from outer tube 130. Supply line 118 couples to inner tube 132, and supply line 120 couples to outer tube 130. Apertures 116 are defined by a plurality of uniformly spaced apertures 140 located along a bottom surface region 131 of outer tube 130 and a plurality of regularly spaced apertures 142 located along a bottom surface region 133 of inner tube 132. Apertures 142 are substantially concentrically aligned with apertures 140. During preheat operations, fuel discharged from apertures 142 becomes entrained in the flow of air discharged from apertures 140. To ensure that an appropriate flame speed is maintained, the number and diameter of each of apertures 142, and the number and diameter of each of apertures 140, are selected to ensure that the velocities of the fuel discharged from apertures 142 and of the air discharged from apertures 140 are maintained at desired values. For example, in the exemplary embodiment, the fuel discharge velocity is between 50 and 150 meters per second (50-150 m/s), and the air discharge velocity is between 5 and 40 meters per second (5-40 m/s).

In another alternative embodiment (not shown), the distributor ring is configured as a simple hollow circular tube. In such an alternative embodiment, the supply lines for fuel and oxidizer are coupled to a regulator that is positioned outside of, and coupled to, the distributor ring. The regulator mixes the fuel and air supplied by the supply lines in a proportion desired to obtain appropriate heating of the gasification vessel. The distributor ring apertures may be uniformly spaced along a bottom surface region of the distributor ring. Alternatively, the, distributor ring apertures may be oriented radially outwardly, or are placed in any other suitable orientation.

FIG. 4 illustrates an alternative exemplary embodiment of distributor ring 160 that may be used with gasification vessel 100, wherein distributor ring 160 is formed as a simple hollow rectangular tube. FIG. 5 is a sectional top view of alternative distributor ring 160. Distributor ring 160 has a rectangular plan configuration, and also has a rectangular cross-sectional configuration. A plurality of distributor ring apertures 170 is located along an outer periphery 171 of distributor ring 160 to direct flames radially outwardly. Alternatively, distributor ring apertures 170 may be spaced along a bottom surface region 172, to direct flames downwardly. Alternatively, distributor ring apertures 170 may be located at any suitable positions to enable the preheater assembly to function as described herein.

Figure 6:
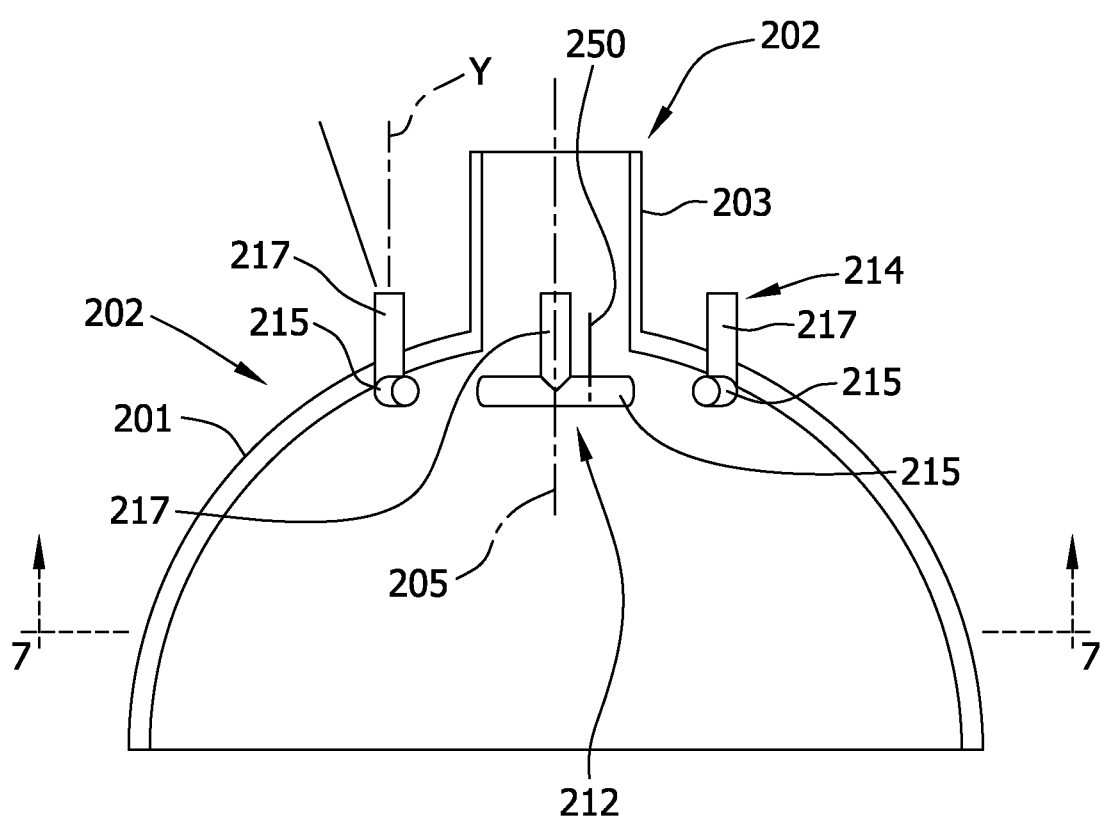
FIG. 6 is a sectional side elevational view of a gasifier illustrating another alternative distributor ring configuration.
Figure 7:
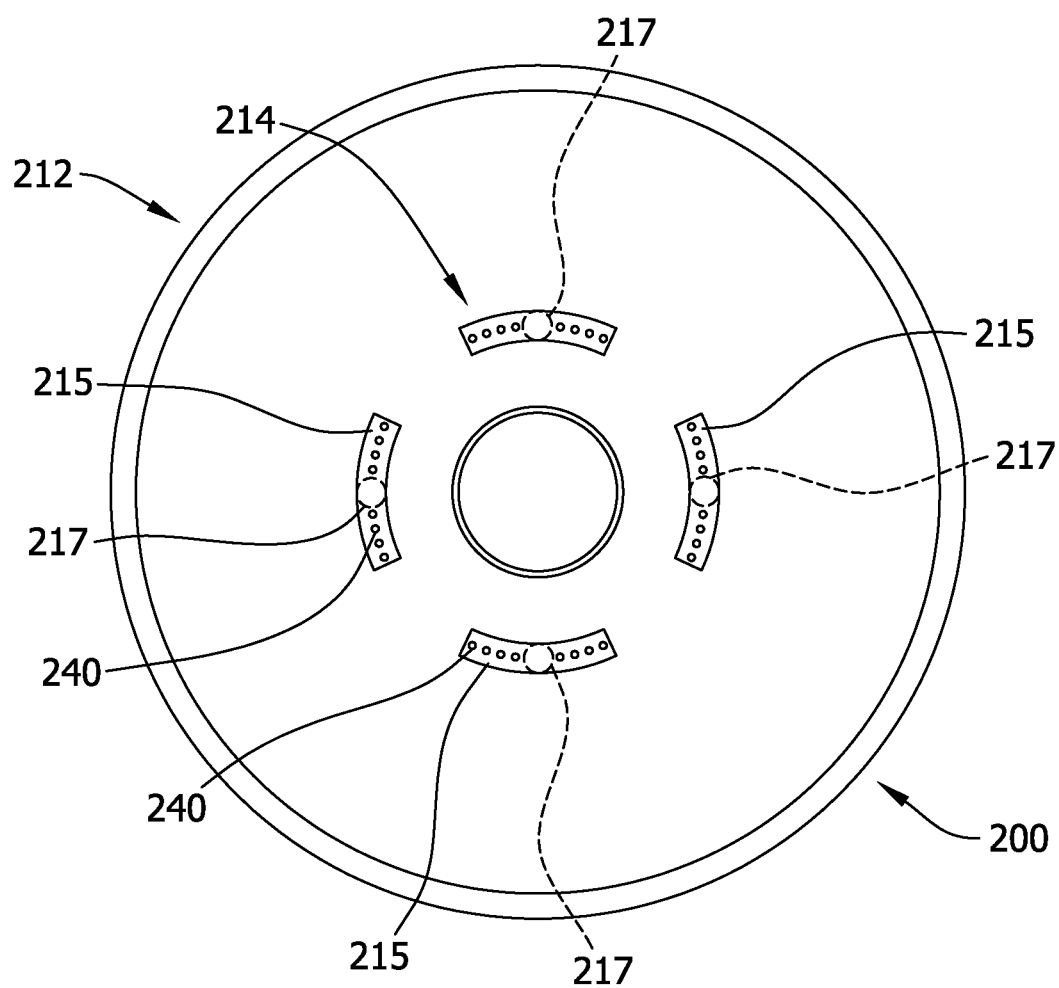
FIG. 7 is a sectional bottom view of the gasification vessel shown in FIG. 6, and illustrating the alternative distributor ring configuration.

FIG. 6 is a schematic side elevational view of an alternative gasification vessel 200 including a preheater assembly 212. Preheater assembly 212 remains in gasification vessel 200, after preheat operations have ended, and during normal gasification operations. Gasification vessel 200 includes a shell dome 201, and a primary feed injector nozzle assembly 202 that extends through an aperture 203 in shell dome 201. Primary feed injector nozzle assembly 202 includes inner and outer nozzles (not shown) that supply fuel and air, in the same manner similar to that described above with respect to gasification vessel 100 (shown in FIGS. 2 and 3). FIG. 7 is a bottom sectional view of gasification vessel 200. Preheater assembly 212 is mounted within gasification vessel 200. A distributor ring 214 includes a plurality of ring segments 215, each of which is arcuate. Although four ring segments 215 are illustrated, any number of ring segments 215 may be used that enables preheater assembly 212 to function as described herein. In addition, while ring segments 215 are shown in FIGS. 6 and 7 as being substantially uniformly spaced about primary feed injector nozzle assembly 202, in an alternative embodiment, ring segments 215 may be unevenly spaced about primary feed injector nozzle assembly 202.

Preheater assembly 212 also includes at least one supply tube 217 that may be selectively coupled to a fuel source 225 (such as natural gas or propane) and a source 223 of oxidizer (such as air or $O_2$), or to sources 227 and 229, respectively, of $CO_2$ and/or steam. Supply tubes 217 are illustrated as extending vertically upwards in FIGS. 6-7. In alternative embodiments, supply tubes 217 may extend upward at an angle theta (θ), wherein θ is greater than or equal to zero and less than or equal to 90° (0°≤θ≤90°), relative to the vertical axis Y that is oriented parallel to longitudinal axis 205 of gasification vessel 200.

Figure 8:
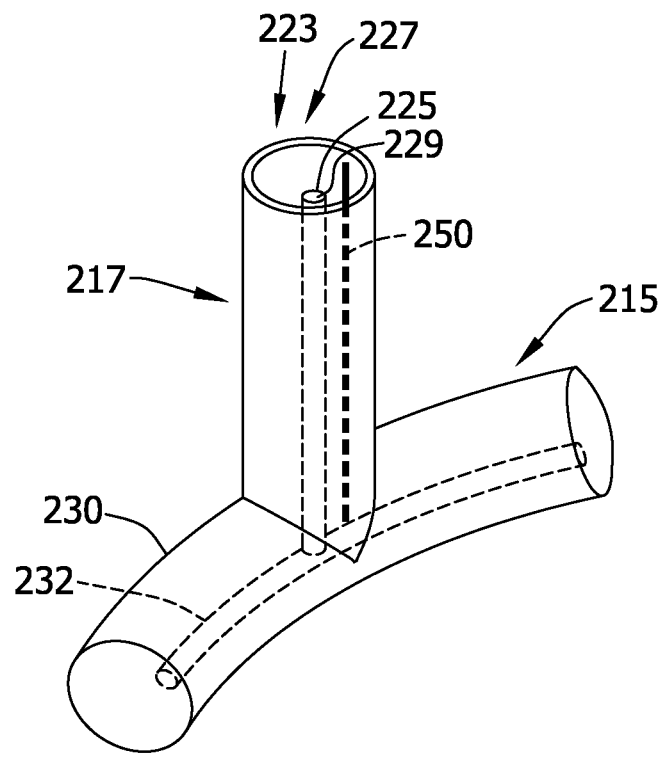
FIG. 8 is a perspective view of a portion of the alternative distributor ring configuration shown in FIG. 6 and illustrating an individual ring segment.
Figure 9:
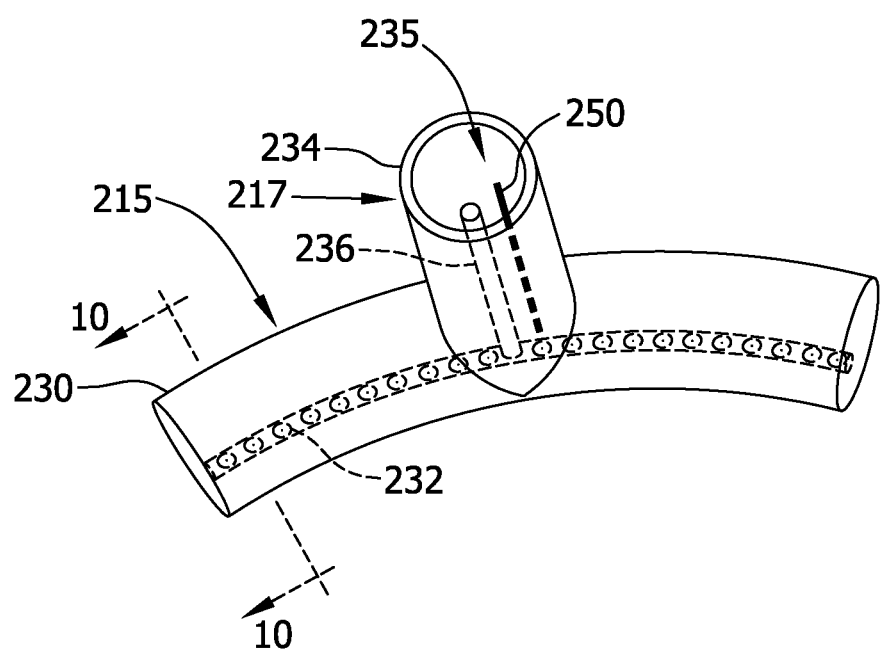
FIG. 9 is a top perspective view of the ring segment shown in FIG. 8.

FIG. 8 is a perspective view of one exemplary ring segment 215 and corresponding supply tube 217. In the exemplary embodiment, each ring segment 215 and corresponding supply tube 217 have tube-within-tube configurations. FIG. 9 is another perspective view of ring segment 215 and corresponding supply tube 217. Each ring segment 215 includes an outer segment tube 230 and an inner segment tube 232. Each supply tube 217 includes an outer supply tube 234 and an inner supply tube 236. In the exemplary embodiment, outer supply tube 234 is selectively coupled to an air source 223 and to a source 227 of $CO_2$ or steam. In the exemplary embodiment, inner supply tube 236 is selectively coupled to a fuel source 225 and to a source 229 of $CO_2$ or steam.

Figure 10:
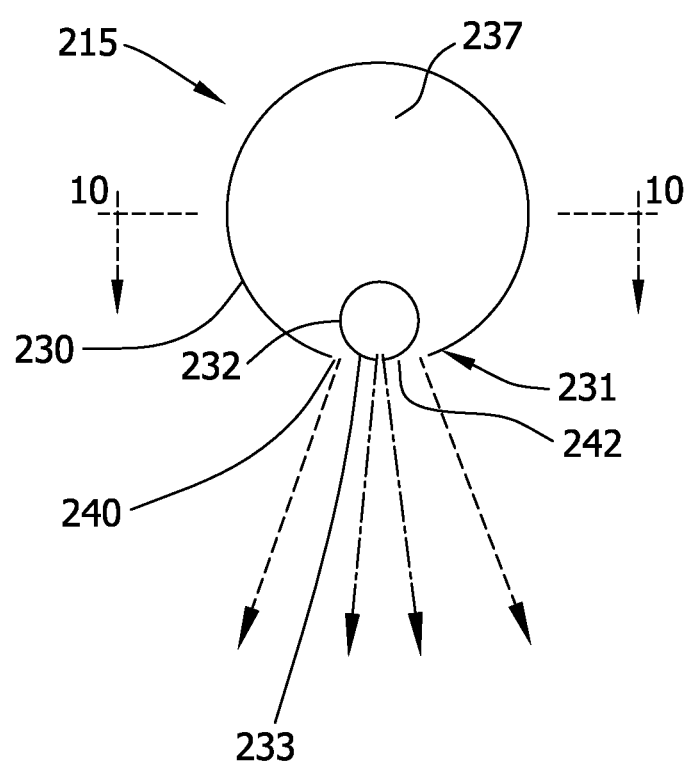
FIG. 10 is a sectional side view of a fuel/air aperture region of the ring segment shown in FIG. 9.

FIG. 10 is a sectional view of a portion of ring segment 215. In the exemplary embodiment, a plurality of apertures 240 is located along a lower surface 231 of outer segment tube 230, wherein apertures 240 are spaced substantially evenly along outer segment tube 230. Moreover, in the exemplary embodiment, apertures 240 are substantially circular. A plurality of apertures 242 is substantially evenly spaced along a lower surface 233 of inner segment tube 232, wherein apertures 242 are substantially concentrically aligned with apertures 240. Similarly, in the exemplary embodiment, apertures 242 are substantially circular. In the exemplary embodiment, inner supply tube 236 is substantially coaxial with outer supply tube 234, and tubes 236 and 232 are maintained in position relative to outer supply tube 234 and outer segment tube 230, respectively, via suitable welding and/or webs of material (not shown), and/or any other coupling mechanism that maintains the orientation of tubes 232, 234 and 230. An annular space 235 is defined between outer supply tube 234 and inner supply tube 236, and a space is defined between outer segment tube 230 and inner segment tube 232.

In the exemplary embodiment, air is supplied from air source 223, and is channeled through annular spaces 235 (defined between outer supply tube 234 and inner supply tube 236) and spaces 237 (defined between outer segment tubes 230 and inner segment tubes 232), and discharged from apertures 240. Fuel from source 225 is channeled through inner supply tubes 236 and inner segment tubes 232, prior to being discharged from apertures 242, entrained in the flow of air, and subsequently being injected into the interior of gasification vessel 200. Igniters 250 ignite the fuel and air. Preheater assembly 212 operates in the same manner as described with respect to preheater assembly 112. After preheating, the flows from air source 223 and fuel source 225 are stopped. During gasification operations, one or both of outer supply tubes 234 and inner supply tubes 236 are coupled to a source 227 of $CO_2$ and/or to a source 229 of steam, or other cooling and/or moderating agent, to provide cooling for primary feed injector nozzle assembly 202 and/or to enable the moderating agent to control the gasification process.

The use of ring segments 215, rather than an annular ring, such as distributor ring 114 (illustrated in FIG. 2), facilitates resistance to the cracking of ring segments 215, or weld failure that may arise through repeated thermal cycling of preheater assembly 212. In addition, ring segments are easier to fabricate (including heat treatment) and install than complete ring-shaped structures. In addition, preheater assembly 212 may be provided with cooling mechanisms (not shown), similar to those previously described with respect to preheater assembly 112.

While gaseous fuels may be used with preheater assemblies 112, 212, it is also contemplated that liquid fuels may be used. Liquid fuels would be atomized at the point of release at, e.g., apertures 142, 242. Preferably, apertures 140, 142 and 240, 242 will be configured so that the fuel flow (not shown) becomes entrained within the surrounding air/oxidizer flow, to facilitate mixing and/or atomization of the fuel with the air, through the use of appropriately configured nozzles or apertures. Preferably, preheater assemblies 112, 212 will be configured to use a variety of possible fuels, such as natural gas, propane, syngas, atomized liquid fuels, etc., as may be desired. In addition, for safety considerations, appropriate gas flow or flame detection devices (not shown) will be located proximate preheater assemblies 112, 212 and suitably controlled to cut off flow of fuel, in the event of ignition failure or flame-out.

In contrast to known gasification systems, the gasifier preheater fuel systems as described herein enable a preheater assembly to be installed in a gasification vessel, and maintained in the gasification vessel, after preheating operations have ceased and while gasification operations are carried out. As a result, in contrast to known gasification systems, the gasifier preheater fuel systems described herein eliminate the down time required to install preheater injection nozzles and then remove them, once preheating operations have ended. In addition, the gasifier preheater fuel systems described herein reduce or eliminate the safety hazards associated with the repeated removal and reinstallation of large, heavy and cumbersome gasifier components. Furthermore, the gasifier preheater fuel systems described herein reduce gasifier startup time and further reduce or eliminate the requirement for operator intervention during exchange of equipment. Moreover, the gasifier preheater fuel systems described herein eliminate the need for separate dedicated structures for supplying $CO_2$, steam and/or other cooling or moderating agents needed for protection of the main gasifier feedstock and oxidizer injector structures or for facilitating control of the gasification process.

Exemplary embodiments of a gasifier preheater fuel and moderator injection apparatus, system and method are described above in detail. The apparatus, system and method are not limited to the specific embodiments described herein, but rather, components of the apparatus and systems and/or steps of the methods may be utilized independently and separately from other components and/or steps described herein. For example, the present apparatus, system and method herein may be used with other reactor installations that require a preheating stage, and in which the fuel or feedstocks used in the primary process steps are not compatible with the fuels used in the preheating stages.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A gasifier for use in generating syngas, said gasifier comprising:
   a vessel comprising a dome having a longitudinal axis extending therethrough;
   a primary nozzle assembly coupled to said dome for injecting gasifier feedstock and oxidizer into said vessel during normal gasification operations; and
   a preheater assembly securely coupled to said vessel, said preheater assembly comprising:
      a distributor ring comprising an outer tube and an inner tube circumscribed by said outer tube; and
      at least one supply line coupled to said distributor ring and to at least one of a source of fuel, a source of oxidizer, a source of cooling agent, and a source of moderating agent, wherein said outer tube is selectively coupled to the source of oxidizer and to at least one of the source of cooling agent and the source of moderating agent, said inner tube being selectively coupled to the source of fuel, such that said preheater assembly is configured to selectively discharge at least one of fuel and oxidizer, and at least one of cooling agent and moderating agent into said vessel to facilitate preheating said gasifier prior to normal gasification operations.

2. A gasifier in accordance with claim 1, further comprising:
   a plurality of first apertures defined in a lower surface of said outer tube; and
   a plurality of second apertures defined in a lower surface of said inner tube, wherein said second apertures are substantially concentrically aligned with said first apertures.

3. A gasifier in accordance with claim 1, wherein said distributor ring further comprises one of a continuous annular structure encircling the longitudinal axis of the gasification vessel, and at least two separate ring segments spaced about the longitudinal axis in an annular orientation.

4. A gasifier in accordance with claim 1, wherein said distributor ring comprises one of a circular cross-section and a rectangular cross-section.

5. A gasifier in accordance with claim 1 wherein said preheater assembly further comprises an igniter coupled to said distributor ring for igniting a fuel and oxidizer mixture discharged from said distributor ring.

6. A method for assembling a gasifier, said method comprising:
   providing a vessel comprising a dome having a longitudinal axis extending therethrough;
   coupling a primary nozzle assembly to said dome for injecting gasifier feedstock and oxidizer into said vessel during normal gasification operations; and
   coupling a preheater assembly securely to said vessel, said preheater assembly comprising:
      a distributor ring comprising an outer tube and an inner tube circumscribed by said outer tube; and
      at least one supply line coupled to said distributor ring and to at least one of a source of fuel, a source of oxidizer, a source of cooling agent, and a source of moderating agent, wherein said outer tube is selectively coupled to the source of oxidizer and to at least one of the source of cooling agent and the source of moderating agent, said inner tube being selectively coupled to the source of fuel, such that said preheater assembly is configured to selectively discharge at least one of fuel and oxidizer, and at least one of cooling agent and moderating agent into said vessel to facilitate preheating said gasifier prior to normal gasification operations.

7. A method in accordance with claim 6, said method further comprising:
   defining a plurality of first apertures in a lower surface of said outer tube;
   defining a plurality of second apertures in a lower surface of said inner tube; and
   substantially concentrically aligning said second apertures with said first apertures.

8. A method in accordance with claim 6, said method further comprising configuring said distributor ring as one of a continuous annular structure encircling the longitudinal axis of the gasification vessel, and at least two separate ring segments spaced about the longitudinal axis in an annular orientation.

9. A method in accordance with claim 6, said method further comprising configuring said distributor ring with one of a circular cross-section and a rectangular cross-section.

10. A method in accordance with claim 6, said method further comprising coupling an igniter to said distributor ring for igniting a fuel and oxidizer mixture discharged from said distributor ring.

11. A gasifier preheater system for use with a gasifier, wherein said gasifier comprises a vessel including a dome having a longitudinal axis extending therethrough, said gasifier preheater system comprising:
   a primary nozzle assembly coupled to said dome for injecting gasifier feedstock and oxidizer into said vessel during normal gasification operations; and
   a preheater assembly securely coupled to said vessel, said preheater assembly comprising:
      a distributor ring comprising an outer tube and an inner tube circumscribed by said outer tube; and
      at least one supply line coupled to said distributor ring and to at least one of a source of fuel, a source of oxidizer, a source of cooling agent, and a source of moderating agent, wherein said outer tube is selectively coupled to the source of oxidizer and to at least one of the source of cooling agent and the source of moderating agent, said inner tube being selectively coupled to the source of fuel, such that said preheater assembly is configured to selectively discharge at least one of fuel and oxidizer, and at least one of cooling agent and moderating agent into said vessel to facilitate preheating said gasifier prior to normal gasification operations.

12. A gasifier preheater system in accordance with claim 11, further comprising:
   a plurality of first apertures defined in a lower surface of said outer tube; and
   a plurality of second apertures defined in a lower surface of said inner tube, wherein said second apertures are substantially concentrically aligned with said first apertures.

13. A gasifier preheater system in accordance with claim 11, wherein said distributor ring further comprises one of a continuous annular structure encircling the longitudinal axis of the gasification vessel, and at least two separate ring segments spaced about the longitudinal axis in an annular orientation.

14. A gasifier preheater system in accordance with claim 11, wherein said distributor ring comprises one of a circular cross-section and a rectangular cross-section.

* * * * *